United States Patent

Haigh et al.

[15] 3,686,827
[45] Aug. 29, 1972

[54] REMOVAL OF ORGANIC VAPORS FROM GAS

[72] Inventors: Daniel H. Haigh, 4100 Lakeside Dr., Beaverton, Mich. 48612; Richard H. Hall, 1187 E. Stewart Rd. Rt. 2; Clarence E. Lange, 3112 Spruce, both of Midland, Mich. 48640

[73] Assignee: The Dow Chemical Company, Midland, Mich.

[22] Filed: Oct. 16, 1970

[21] Appl. No.: 81,563

[52] U.S. Cl. .................................................. 55/74
[51] Int. Cl. ........................................... B01d 53/02
[58] Field of Search ..................... 55/73, 74, 387, 62

[56] References Cited

UNITED STATES PATENTS

| 3,399,513 | 9/1968 | House et al. ................... 55/74 |
| 3,556,716 | 1/1971 | Pollio et al. ................. 55/74 X |
| 3,564,818 | 2/1971 | Lasky ............................. 55/73 |

*Primary Examiner*—John Adee
*Attorney*—Griswold & Burdick, Richard G. Waterman and Robert B. Ingraham

[57] ABSTRACT

Alkylstyrene polymer particles are used as an absorbent for organic vapors and are particularly effective for removing organic vapors from air.

14 Claims, No Drawings

REMOVAL OF ORGANIC VAPORS FROM GAS

Oftentimes it is desired to separate organic vapors from air. Oftentimes this is accomplished by employing a bed of activated charcoal or similar material and passing the contaminated gas such as air therethrough where the organic vapors, or at least a portion thereof, are retained on the absorbent. In many instances, it is desirable to have such an absorbent or material in a relatively small space and having a carefully controlled configuration. It is also desirable that such sorption be rapid and that the organic material be desorbed from the bed with relative ease. In accordance with the present invention, it has been found that polymers of alkylstyrenes are remarkably effective for the absorption of organic vapors from a carrier gas such as air. Such absorption is highly desirable for organic vapors such as gasoline vapors and the like.

It would be desirable if there were available an improved method for the separation of organic vapors from a carrier gas.

It would also be desirable if there were an improved low volume bed which would rapidly remove organic vapors from air.

It would further be highly desirable if there were available an improved method for the separation of organic vapors and air.

These benefits and other advantages in accordance with the present invention are achieved in a method for the separation of organic vapors from gases, the steps of the method comprising providing a gas and vapor permeable body of an alkylstyrene polymer, passing through said body a carrier gas containing organic vapor, thereby removing at least a portion of the organic vapor from the carrier gas.

Preferably, crosslinked polymers of alkylstyrenes, and advantageously of tertiary-alkylstyrenes, are utilized as the imbibing agent in the process of this invention. Those alkylstryrenes which can be used to prepare these polymers have alkyl groups containing from four to 20, and preferably from four to 12, carbon atoms, such as: tertiary-alkylstyrenes including for example, p-tert-butylstyrene, p-tert-amylstyrene, p-tert-hexylstyrene, p-tert-octylstyrene, p-tert-dodecylstyrene, p-tert-octadecylstyrene, and p-tert-eicosylstyrene; n-alkylstyrenes including for example n-butylstyrene, n-amylstyrene, n-hexylstyrene, n-octylstyrene, n-dodecylstyrene, n-octadecylstyrene, and n-eicosylstyrene; sec-alkylstyrenes including for example sec-butylstyrene, sec-hexylstyrene, sec-octylstyrene, sec-dodecylstyrene, sec-octadecylstyrene, and sec-eicosylstyrene; isoalkylstyrenes including for example isobutylstyrene, isoamylstyrene, isohexylstyrene, isooctylstyrene, isododecylstyrene, isooctadecylstyrene, and isoeicosylstyrene; and copolymers thereof.

Especially preferred for use in the practice of the invention are crosslinked copolymers of such alkylstyrenes as heretofore described and an alkyl ester derived from a $C_1$ to $C_{18}$ alcohol and acrylic or methacrylic acid or mixture thereof.

Suitable monomers which may be employed as comonomers with the alkylstyrene include such materials as vinylnaphthalene, styrene, α-methylstyrene, ring-substituted α-methylstyrenes, halostyrenes, arylstyrenes and alkarylstyrenes; methacrylic esters, acrylic esters, fumarate esters and half esters, maleate esters and half esters, itaconate esters and half esters, vinyl biphenyls, vinyl esters of aliphatic carboxylic acid esters, alkyl vinyl ethers, alkyl vinyl ketones, α-olefins, isoolefins, butadiene, isoprene, dimethylbutadiene, acrylonitrile, methacrylonitrile and the like.

It is important that the polymers used in the process of the invention contain a slight amount of crosslinking agent, preferably in the range of from about 0.01 to 2 percent by weight. The most efficient imbibition of organic liquid contaminants occurs when the level of crosslinking agent is less than about 1 percent since this permits the polymers to swell easily and imbibe a substantial volume of the organic material. When organic vapor-contaminated gases are percolated through a packed column or bed, up to 2 percent crosslinking agent is satisfactory because a lower volume of organic material imbibed by the polymer can be tolerated in this type of operation.

Crosslinking agents which can be used in preparing the imbibing polymers suitable for use in the present invention include polyethylenically unsaturated compounds such as divinylbenzene, diethylene glycol dimethacrylate, diisopropenylbenzene, diisopropenyldiphenyl, diallylmaleate, diallylphthalate, allylacrylates, allylmethacrylates, allylfumarates, allylitaconates, alkyd resin types, butadiene or isoprene polymers, cyclooctadiene, methylene norbornylenes, divinyl phthalates, vinyl isopropenylbenzene, divinyl biphenyl, as well as any other di- or poly-functional compound known to be of use as a crosslinking agent in polymeric vinyl-addition compositions. Normally, the polymer containing the crosslinking agent swells with the imbibed organic material. If there is too much crosslinking agent, the imbibition takes an unreasonably long time or the polymer is unable to imbibe a sufficient quantity of the organic vapor, thus reducing the effectiveness of the polymer as an imbiber. If the imbibitional polymer contains no crosslinking agent or too little crosslinking agent, then it will dissolve in the organic material resulting, for example, in a non-discrete, non-particulate mass of polymer-thickened organic liquid.

A particularly beneficial embodiment of the invention is one wherein the alkylstyrene polymer contains at least a quantity of alkylstyrene as determined by the equation $p = (100/n)$ wherein $p$ is the weight percent of the alkylstyrene copolymerized in the polymer and n is the number of carbons in the alkyl side chain, and most advantageously $p$ is equal to $(200/n)$.

Polymers for the practice of the method of the present invention may be prepared by any convenient technique, either suspension, emulsion or mass polymerization. Generally, the method of preparation is selected to provide polymer in the most convenient form for any particular application. Thus, if it is desired to have free-flowing, readily packed beads, generally suspension polymerization is employed to provide a plurality of small beads. If it is desired to obtain a bed having the maximum amount of polymer surface and a relatively high permeability rate toward a gas carrying an organic vapor, it is oftentimes desirable to employ an emulsion polymerization technique and recover the polymer by spray drying. If it is desired to obtain a body of predetermined configuration, it is oftentimes beneficial to employ a mass polymerization technique wherein a polymer-insoluble diluent is employed.

Techniques for the preparation of such porous polymers are disclosed in U.S. Pat. No. 3,322,695. Such porous polymers can also be prepared by either suspension or mass polymerization. Alternately, satisfactory beds are prepared by mass or suspension polymerization and subsequent comminution of the polymer. The particle size of such polymers is selected in accordance with the desired application, larger particles being employed for high permeability beds, smaller particles for high absorption and lower permeability.

Various methods of carrying out the process of the present invention will be readily apparent to those skilled in the art. In one embodiment, the process is carried out by contacting the alkylstyrene polymer with the gas containing the organic vapor. For example: in removing organic vapors from a so-called dry box, a body of the particulate polymer is disposed within the box and diffusion relied upon for carrying the organic vapor to the polymer. In another embodiment, the process is carried out by packing a column with particulate polymer and passing the gas containing the organic vapors therethrough. In still another embodiment of the invention, the particulate polymer is maintained within a suitable chamber and the gas passed upwardly therethrough to form a fluidized bed of particles. Both the amount of polymer employed and the type of alkylstyrene utilized in the polymer depend upon the carrier gas and the particulate organic material to be removed. For example: if one desires to remove a particular organic material from a gas such as air, any alkylstyrene polymer which, in its uncrosslinked form is soluble in the material to be removed, is found eminently satisfactory when employed in slightly crosslinked form.

The method or process of the present invention can be used in almost any situation where it is necessary to selectively remove organic vapors from gases which do not dissolve or swell the alkylstyrene polymer. The process of the present invention is used with particular advantage for the removal of gasoline fumes from air, such as the gasoline vapors arising from the carburetor and fuel tank of a gasoline engine. It is also eminently satisfactory for recovering solvents such as toluene, methyl ethyl ketone and chlorinated solvents such as methylenechloride, trichloroethylene, methylchloroform and the like. The degree of removal of the organic vapor can be readily varied by varying the size of the bed through which the vapors are passed and/or the velocity at which the vapors are passed through the bed.

The following examples illustrate the invention but are not to be construed as limiting. In the following examples, unless otherwise designated, all parts are parts by weight.

EXAMPLE 1

Suspension polymerized t-butylstyrene polymer is prepared in the following manner: a reaction mixture of 2,000 parts of deionized water; 8 parts hydroxymethylcellulose having a solution viscosity of 400 centipoise 2 weight percent solution in water at 25° C.; 0.2 part potassium dichromate; 1 part benzoyl peroxide; ½ part divinylbenzene and 900 parts p-t-butylstyrene. The reaction vessel is a generally spherical flask having four creases formed therein. The reaction vessel is fitted with an agitator reflux condenser. The reaction vessel is purged with nitrogen to remove any dissolved oxygen. The mixture with agitation is then heated to 80° C. and maintained at 80° C. for a period of 16 hours. The temperature of the reaction mixture is subsequently raised to 90° C. and the temperature maintained for a period of 4 hours. The reaction mixture is then cooled to about 30° C., filtered and washed with water to remove the suspending agent and subsequently washed with methanol and dried in an air oven at a temperature of about 40° C. The beads have an average diameter of about 150 microns, and on microscopic examination appear as a solid. A plurality of portions of the polymer are charged into a 1 milliliter hypodermic syringe. A small amount of glass wool is initially placed in the syringe to prevent the beads from falling through the syringe. 0.1 milliliter of dry sand is disposed above the polymer bed. The interstitial space within the bed is approximately 0.2 milliliter. Three microliters of organic liquid are placed on the sand and the piston or plunger of the hypodermic is immediately inserted into the syringe barrel to leave an air space above the bed of about 0.4 milliliter. After 5 minutes have elapsed, the plunger of the syringe is forced toward the bed, thereby passing air containing organic vapor through the beads. The air discharging from the syringe is passed to a gas chromatograph. In each instance, a blank determination is made employing 0.6 milliliter of sand. The effluent from the syringe is passed to a gas chromatograph and the relative amounts of the organic liquid in the effluent determined and the percentage removal calculated. The following organic liquids are employed and the percentage removal indicated: isoprene - 80.29; diethylether - 64; diethylamine - 91.4; hexane - 61.9; methyl ethyl ketone - 98.3; isopropyl alcohol - 68.3; methyl butyl sulfide - 100; acrylonitrile - 100; methylenechloride - 91.4; benzene - 100.

EXAMPLE 2

Employing the procedure of Example 1, a copolymer of equal parts of t-butylstyrene and methylmethacrylate and 0.5 part divinylbenzene is prepared having an average diameter of about 130 microns. Three glass tubes are prepared, each about 65 milliliters in length and about 7 milliliters inside diameter. In one tube a bed of about 37 milliliters in length of polymer beads is placed, being terminated on each end with about one-eighth inch of cotton fibers. A similar size bed of sand is placed in a second tube, and in a third tube a bed of generally similar length is prepared by removing two fibrous filters from commercially available filter-type cigarettes. Into one end of each of the tubes is placed a cigarette filter. A cigarette with filter removed is placed at the opposite end of the tubes. The cigarettes are lighted and tobacco smoke drawn through the beds and through the cigarette filters disposed at the exit end of the tubes. The first tube containing the t-butylstyrene/methylmethacrylate beads shows a slight yellowing of the cigarette filter at the exit end of the tube. The exit cigarette filters in the two remaining tubes are brown and have a color approximating that of coffee with cream.

EXAMPLE 3

Employing the polymerization procedure of Example 1, a copolymer is prepared from a monomer mixture containing 500 parts t-amylstyrene; 400 parts diethylmaleate and ½ part diethyleneglycol dimethacrylate. The polymer particles have a diameter of about 160 microns. The polymer is evaluated for absorption properties employing a hypodermic and gas chromatograph as in Example 1. Three microliters of ethyl acetate are employed and 82.6 percent of the organic material is removed by the polymer beads.

EXAMPLE 4

In a manner similar to Example 1, a polymer is prepared employing 652 parts t-dodecylstyrene; 338 parts methyl isopropenyl ketone and ½ part allylacrylate. The particles are about 140 microns average diameter. In the manner of Example 1, the polymer is evaluated for absorption of methylenechloride vapor and 97.7 percent of the methylenechloride is removed.

EXAMPLE 5

In a manner similar to Example 1, a t-dodecylstyrene polymer is prepared employing 1,000 parts dodecylstyrene and one part divinylbenzene. The catalyst employed is one part t-butylperoctoate. Evaluation in a manner similar to Example 1 for organic vapor absorption is carried out employing pentane and 65.4 percent of the pentane is removed.

EXAMPLE 6

A mixture of 720 parts hexylstyrene and 280 parts methacrylonitrile is prepared. The mixture is placed in ampules measuring approximately one-half inch in diameter and 3 feet in length until the ampules are about two-thirds full. The ampules are then purged with nitrogen for a period of about 5 minutes and subsequently cooled in a mixture of dry ice and trichloroethylene until the temperature of the contents is below 0° C. The ampules are evaluated and flame sealed. The ampules are then placed in a circulating liquid bath having a temperature of 100° C. for a period of 24 hours. After 24 hours, the bath temperature is raised to 140° C. for an additional 24 hours. The ampules and resultant polymer contained therein are cooled and the glass ampules removed from the resultant polymer rod. Portions of the polymer are dissolved in benzene to form a 4 weight percent solution. Rayon fiber shorts are sprayed with the solution and the fibers are agitated and dried to provide polymer-coated fibers. After drying, the polymer fibers appear to contain about 12 weight percent of the hexylstyrene methacrylonitrile. Employing the procedure of Example 1 wherein the coated fibers are employed to form a 0.4 milliliter bed within the hypodermic syringe, the bed is evaluated for removal of methyl ethyl ketone vapor and is found to remove 84.4 percent of the methyl ethyl ketone.

EXAMPLE 7

Employing the polymerization procedure of Example 6, a polymer is prepared from a mixture of 50 parts eicosylstyrene, 950 parts vinyl butyl ether and 0.5 part diallylmaleate. The polymerization schedule is 80° C. for 48 hours followed by 24 hours at 140° C. The resultant polymer is ground to pass through a 30 mesh screen and be retained on a 100 mesh screen and evaluated for absorption of diethyl ether in the manner of Example 1. The polymer removes 85.6 percent of the diethyl ether.

EXAMPLE 8

In the manner of Example 6, a copolymer of t-octylstyrene and styrene is prepared employing 125 parts t-octylstyrene, 875 parts styrene and 0.25 part divinylbenzene. The ampules are purged with nitrogen for 4 minutes and after sealing are subject to polymerization at 90° C. for 24 hours and 120° C. for an additional 25 hour period. The resultant polymer is crushed and evaluated for vapor absorption in the manner of Example 1 employing toluene. A 94.1 percent reduction in toluene vapor is obtained.

EXAMPLE 9

A mixture of 800 parts hexylstyrene, 200 parts isoprene and 0.5 part divinylbenzene is placed in glass ampules, the ampules purged with nitrogen for 2 minutes and 0.15 part n-butyllithium added as a 15 weight percent solution in hexane. The ampules are evacuated, flame sealed, heated to 60° C. for 48 hours and a further 24 hours at 90° C. The resultant polymer is crushed and particles passing a 30 mesh screen and retained on a 100 mesh screen are evaluated for vapor absorption in the manner of Example 1. Employing 4-vinyl-cyclohexane as the organic vapor, 73.2 percent is removed.

EXAMPLE 10

In a manner similar to Example 6, 1,000 parts of eicosylstyrene containing 1 part divinylbenzene are polmerized by heating at 100 C. for 48 hours and an additional 24 hour period at 160 C. The resultant polymer is crushed and a portion passing through a 30 mesh screen and retained on a 100 mesh screen is evaluated for vapor absorption in the manner of Example 1. Employing ethylbromide as the organic vapor, 61.9 percent is removed.

In a manner similar to the foregoing examples, organic vapors are readily separated from gases such as oxygen, hydrogen, nitrogen, air, helium, argon, krypton, chlorine, ammonia, carbon dioxide, carbon monoxide, steam and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A method for the separation of organic vapors from gases, the steps of the method comprising
   providing a gas and vapor permeable body of an alkylstyrene polymer,
   passing through said body a carrier gas containing organic vapor, thereby
   removing at least a portion of the organic vapor from the carrier gas.

2. The method of claim 1 wherein the alkylstyrene polymer comprises a polymer of an alkylstyrene which has alkyl groups containing from four to 20 carbon atoms.

3. The method of claim 2 wherein the alkyl group contains from four to 12 carbon atoms.

4. The method of claim 1 wherein the alkylstyrene polymer has polymerized therewith a crosslinking agent.

5. The method of claim 4 wherein the crosslinking agent is within a range of from about 0.01 to 2 weight percent.

6. The method of claim 1 wherein the weight percent of alkylstyrene within the polymer is $100/n$ wherein $n$ is the number of carbon atoms in the alkyl side chain.

7. The method of claim 1 wherein the weight percent of alkylstyrene within the polymer is $200/n$ wherein $n$ is the number of carbon atoms in the alkyl side chain.

8. The method of claim 1 wherein the alkylstyrene polymer is a polymer of t-butylstyrene.

9. The method of claim 8 wherein the alkylstyrene polymer is a polymer of t-butylstyrene and methylmethacrylate.

10. The method of claim 1 wherein the carrier gas is air.

11. The method of claim 10 wherein the vapor is a hydrocarbon vapor.

12. The method of claim 1 wherein the carrier gas and organic material is tobacco smoke.

13. A method for the separation of organic vapors from air, the steps of the method comprising
providing a gas and vapor permeable body of an alkylstyrene polymer,
passing through said body air containing organic vapor, thereby
removing at least a portion of the organic vapor from the air.

14. A method for the separation of organic vapors from air, the steps of the method consisting essentially of
providing a gas impermeable body of an alkylstyrene polymer wherein the alkylstyrene polymer comprises a polymer of an alkylstyrene which has alkyl groups containing from four to 20 carbon atoms,
passing through said body air containing an organic vapor, thereby
removing at least a portion of the organic vapor from the air.

* * * * *